UNITED STATES PATENT OFFICE.

RALPH W. CROCKER, OF BOSTON, MASSACHUSETTS.

PROCESS OF PACKING COOKED FOODS AND PRODUCT OF THE SAME.

1,181,115.  Specification of Letters Patent.  Patented May 2, 1916.

No Drawing.  Application filed May 3, 1915. Serial No. 25,638.

*To all whom it may concern:*

Be it known that I, RALPH W. CROCKER, a citizen of the United States, residing at Boston, in the county of Suffolk and State of Massachusetts, have invented new and useful Improvements in Processes of Packing Cooked Foods and Products of the Same, of which the following is a specification.

This invention relates to improvements in processes of packing cooked foods and products of the same.

More particularly it relates to foods hermetically sealed in glass or other containers.

In this art it is already known that certain kinds of meat and fish can be packed in glass advantageously; but it has not heretofore been commercially practicable to pack certain other kinds such as corned beef, chicken, etc., including some preparations of fish, because of the spaces which inevitably form or the greasy and otherwise unappetizing aspect which the contents have when seen through the glass. In efforts to overcome this difficulty various devices have been adopted, such, for example, as filling the spaces of chicken with gelatin, or the careful selection of pieces that are to be packed in glass according to their visual aspect, involving rejection of others which are equally good so far as quality, flavor and edibility are concerned. But the gelatin boils out more or less; the labor of specially selecting pieces adds distinctly to the cost of the product; and in spite of the fact that it is exceedingly desirable for commercial reasons to pack in glass, no method has heretofore been known so far as I am aware by which certain foods can be made to look appetizing through the glass; and as it is necessary that the package be made so that its contents look appetizing in order for it to have a ready sale, this form of marketing is barred.

One object of the present invention is to provide such a means, thus opening a broad market for such foods.

Another object is to reduce the cost of packing foods in glass; and other objects are to render food materials available for packing in glass, in a practical commercial sense, which have not been so heretofore; also to render available for such use cuts or pieces of meats which have heretofore been generally unavailable, because of the requirement of special selection; also to provide a package of cooked food which has a novel and particularly attractive and appetizing aspect, these being qualities of distinct commercial as well as digestive value; and to provide a package of cooked food which, in addition to the foregoing is economical for the ultimate purchaser and consumer, because of the combination of foods therein contained, which enables an individual or a small group to purchase and carry substantially all of the ingredients wanted for a single meal in a single can instead of using different cans in order to get the food wanted for a meal.

The objects of the invention are accomplished by providing a plastic mass of potato mixed with the fish, meat or other ingredient, or else surrounding it, and for the most part lying next to the glass. Potato is not of itself attractive or appetizing when seen through glass. I therefore mold the contents preliminarily into the precise form and size of the container's interior, so that spaces against the glass are filled and liquids are absorbed or kept away, and then by action of heat in any suitable manner, as by a brief period of cooking in oil, I brown the exterior surface of the mass which has thus been molded in size and shape. Then I put the mass into its container and, by "processing" it in any suitable way as by the ordinary packing methods of steaming and sealing, I cook or sterilize the contents and seal the same hermetically. In the best form of the invention as I at present contemplate practising it, the container should be of glass, although the method would work equally well with tin so far as the quality of the product and its preservation and the appetizing aspect of the contents after the can is opened are concerned. However, glass containers differ but little from tin in cost, are uniform in size to a relatively high degree of precision, and have the further advantage of showing the contents, even though it has not hitherto been possible to sell foods packed in glass at the same or near the same prices as foods in tin containers for the reasons above stated.

For a simple illustrative example of the practice of the invention the method of making a package of fish-cake may be taken. Cooked potato is mixed with cooked or otherwise prepared cod-fish, usually shredded, and the two are thoroughly mixed forming a plastic mass. A mold having the shape and size of the ultimate container which is to constitute the package is then filled with this mass, the material being forced into it under relatively high pressure, so that parts of the plastic mass next to the glass are by transmitted pressure forced into cavities to the limit against the smooth walls of the mold, smoothly and completely on all sides. For this purpose it is well that the container should have a flaring shape, with its top opening the largest part. The container itself may be used as a mold if desired; but preferably a gang of molds will be provided when the process is practised commercially, each conforming precisely to the shape and size of the material's ultimate container, and each having a bottom movable inward for use in forcing the material out through the top at the proper time. A press which may be operated by power so as to act upon the entire gang at once from the top may be provided in order to cause the mixture to fill the mold smoothly and completely. The pressure having ceased; a wire basket or screen may be inverted over each mold, or over a number of the molds together, formed of wire netting of suitable size and mesh; and, the gang of molds being then inverted and their bottoms pressed inward, the contents of each mold will be forced out and be supported upon the screen while still preserving its shape. The screen and contents may then be immersed in hot oil for a brief period, or may otherwise be subjected to heat, so that the entire exterior of each molded mass is browned to the desired color. The browned masses may then be put into their individual ultimate containers, the covers thereof put in place, and the covered containers "processed" for their sterilizing and hermetical sealing. Any suitable process may be employed for this step, a convenient method being to set the containers in water or steam so hot that the contents are cooked and gases driven off from within by escaping at the edge of the cover which is held loosely in place by a spring. When this step has been carried on long enough, according to methods already well known, the heat is removed, whereupon cooling causes a shrinkage of contents so that atmospheric pressure holds the cover tightly upon it; or the sealing may be effected in any other suitable way.

In sealing by the method described the cover of the can is flexible, and by yielding to atmospheric pressure follows the contraction of contents somewhat and so prevents the opening of large spaces within. In the finished product the fish-cake then presents an appetizing browned aspect. The injection of potato under pressure having filled spaces with solids, the meat and potato are smooth against the surface; and if there be any empty space within, as there often is in cans containing liquids, the material does not swash around within, but the solid retains its form. Upon opening the package it may be warmed, and further cooked or not according to circumstances. The same process may be applied by arranging a solid piece of meat or fish in the center of the bottom of the mold, so that it will be in the center of the bottom of the container, and surrounding it with a solid mass of potato mashed finely enough so that when subjected to the pressure it can work its way into the interstices and lie smooth against the wall of the mold. In such case the shape and aspect of the piece of meat or fish is to a large degree immaterial, because the potato when inserted in plastic form under pressure finds and fills all vacancies; it does not boil away as does gelatin; and it absorbs such fat, grease and juices as come from the meat and which would otherwise give an unappetizing character to the looks of the package, notwithstanding the fact that such greases, etc., are perfectly natural first quality ingredients. When eaten these juices, being in the potato, are not wasted; and the potato is that much richer. By this meats, broiled fish, fried oysters, tuna, fried cod-fish, roast beef, lamb, corned beef, chicken, turkey, including pieces of chicken such as legs and wings containing bone (*i. e.*, poultry that is only partially boned) can be packed; and when finished will have an appetizing aspect. So also pork and baked beans, as by placing the pork in the center and the beans around it, both showing through the bottom, mashed potato, browned, around that, the whole including the beans being browned superficially after being formed in the mold. In the case of meats packed by this method the introduction of the potato under pressure, and the browning thereof and of the meat, cover irregularities in the meat which under present methods would lead to its rejection, although the piece is perfect so far as quality is concerned. This enables all meat of proper quality to be used without the need of special and expensive selection as to shape and size of pieces, and leads to the double advantage of enabling the sale price to be reduced, so that it approximates the sale price of meat packed in tins, and at the same time of packing the meat so that it is visible through the glass sufficiently for its character to be judged, producing the superiority over tin that the use of a poor quality is not concealed as it is when packed in tin.

On account of the association of the potato and the meat in the same package, within which also may be included other vegetables or food if desired, the opening of a single can may provide all the variety that may be needed for a meal except bread, thus saving all wastage of effort and of food that comes from preparing separate quantities of the different articles of food that go to make a meal, or opening separate cans, no one of which is fully consumed at the time. This feature makes the product especially suitable for camping and traveling parties, as well as for individuals and small families living at home.

I claim as my invention:

1. A process of packing food consisting in the arrangement of a mass of plastic absorbent vegetable food and another variety of food in a mold with the plastic mass around said other variety; subjecting the plastic mass to pressure forcing it into interstices of said other food and smoothly against the mold face; browning the surface of the mass thus molded by subjecting it to heat; and packing and sealing the browned mass in a transparent air-tight container, the said mold being of such form that the browned mass formed therein fills and fits the transparent part of the container smoothly.

2. A process of packing food consisting in the arrangement of a variety of food on the bottom of a mold, with plastic potato surrounding it, subjecting the potato to pressure forcing it smoothly against the mold face and into interstices of the first mentioned variety of food; subjecting the mass to heat on all sides, thereby browning it superficially; and packing the browned mass in an air-tight container of the same shape and size as the mold.

3. A food package comprising a hermetically sealed container and food therein, including a solid food cooked brown superficially and arranged around another variety of solid food, the first-mentioned solid food closely fitting and filling the said container and interstices in said other variety of food.

4. A food package comprising a hermetically sealed transparent container and superficially browned food contents therein, fitting and filling its interior in solid form next to the transparent wall of the receptacle.

5. A food package comprising a hermetically sealed transparent container and superficially browned food contents therein, fitting and filling its interior in solid form next to the transparent wall of the receptacle, consisting of browned mashed potato and another variety of food contacting with and visible through the transparent wall, and surrounded and having its interstices filled by the browned potato except where it is thus visible.

6. A food package comprising a hermetically sealed transparent container, a cooked solid food therein, the cooking of which sets free grease, and plastic potato arranged in intimate proximity to said food unseparated therefrom by any membrane impervious to grease and containing absorbed within itself grease from said cooking.

7. A food package comprising a hermetically sealed transparent container, a solid food therein, the cooking of which sets free grease, arranged against the transparent wall of the container, and a plastic grease-absorbent solid food fitting around the same, unseparated therefrom by any membrane impervious to grease, filling other places in the receptacle and adapted to absorb and conceal within itself grease emanating from said food first mentioned.

Signed by me at Chicago, Illinois, this twenty-ninth (29th) day of April, 1915.

RALPH W. CROCKER.

Witnesses:
M. W. SPEAR,
LOUISE DREHEN,
LILLIAN HUGHES.